US007633425B2

(12) United States Patent
Brown et al.

(10) Patent No.: US 7,633,425 B2

(45) Date of Patent: Dec. 15, 2009

(54) WAVEGUIDE SYSTEM COMPRISING REFLECTIVE SURFACES FOR DIRECTING A WAVE BEAM TO A TARGET

(75) Inventors: Kenneth W. Brown, Yucaipa, CA (US); Vincent Giancola, Chino, CA (US)

(73) Assignee: Ratheon Company, Waltham, MA (US)

( * ) Notice: Subject to any disclaimer, the term of this patent is extended or adjusted under 35 U.S.C. 154(b) by 20 days.

(21) Appl. No.: 11/941,205

(22) Filed: Nov. 16, 2007

(65) Prior Publication Data

US 2009/0128040 A1 May 21, 2009

(51) Int. Cl.
*G01S 7/38* (2006.01)
*H01P 1/16* (2006.01)
*H01J 25/02* (2006.01)

(52) U.S. Cl. ............................ 342/13; 333/21 R; 315/5

(58) Field of Classification Search ............... 333/21 R; 315/5; 342/13, 14

See application file for complete search history.

(56) References Cited

U.S. PATENT DOCUMENTS 3,235,870 A 2/1966 Hannan
4,189,660 A * 2/1980 Dandl ........................ 315/5.38
5,115,482 A 5/1992 Stallard et al.
5,287,365 A 2/1994 Nielsen et al.
5,302,962 A * 4/1994 Rebuffi et al. ............ 343/781 P
5,319,379 A 6/1994 Waken et al.
5,777,572 A * 7/1998 Janusas ........................ 342/13
5,929,720 A * 7/1999 Hirata et al. ................ 333/125
6,061,033 A 5/2000 Hulderman et al.

* cited by examiner

*Primary Examiner*—Benny Lee
(74) *Attorney, Agent, or Firm*—SoCal IP Law Group LLP; Steven C. Sereboff; John E. Gunther

(57) ABSTRACT

In various representative aspects, the present invention provides systems and methods for waveguides. A waveguide may comprise a housing and a plurality of reflective surfaces configured to couple to the housing. The housing may be configured to couple to an electromagnetic wave beam generator. The electromagnetic wave beam generator may, be configured to provide a wave beam having a polarization substantially similar to its initial polarization. At least one of the plurality of reflective surfaces may be configured to convert the mode of an incident wave beam. The plurality of reflective surfaces may be configured for alignment in a waveguide.

17 Claims, 6 Drawing Sheets

WAVEGUIDE SYSTEM COMPRISING REFLECTIVE SURFACES FOR DIRECTING A WAVE BEAM TO A TARGET

FIELD OF INVENTION

The present invention generally concerns waveguides and their components. More particularly, representative and exemplary embodiments of the present invention generally relate to systems, devices and methods for providing a wave beam with a particular alignment that may be configured using a plurality of reflective surfaces.

BACKGROUND OF INVENTION

A waveguide may be broadly defined to include any system that is configured to modify the properties of a wave. For example, the ear canal may be described as a waveguide configured to direct variations in pressure to the ear drum. As another example, a fiber optic cable may be described as a waveguide configured to direct light along the length of the cable.

In addition to receiving signals and transmitting information, waveguides are generally employed in directed energy systems. In these systems, a waveguide is generally coupled to a wave beam generator. The waveguide is configured to transmit the output wave beam to an antenna system which in turn transmits the wave beam to a target.

Directed energy systems may include specialized waveguide systems. For example, a mode conversion system is usually disposed within the wave beam generator. As another example, a wave beam conditioning system is usually disposed external to the wave beam generator to enhance the properties of the converted wave beam.

Existing systems used to transmit the wave beam generally include an internal mode converter, an external beam conditioner, and a waveguide. These systems are often expensive in that the manufacturer of the generator is generally required to custom construct the internal mode converter. Further, these systems are generally complex to align in that they include a set of reflective surfaces dedicated to the internal mode converter, a second set of reflective surfaces dedicated to the external beam conditioner, and a third set of reflective surfaces dedicated to the waveguide.

SUMMARY OF THE INVENTION

In various representative aspects, the present invention provides systems and methods for waveguides. A waveguide may comprise a housing and a plurality of reflective surfaces configured to couple to the housing. The housing may be configured to couple to an electromagnetic wave beam generator. The electromagnetic wave beam generator may be configured to provide a wave beam having a polarization substantially similar to its initial polarization. At least one of the plurality of reflective surfaces may be configured to convert the mode of an incident wave beam. The plurality of reflective surfaces may be configured for alignment in a waveguide.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system for directing a wave. Certain representative implementations may include, for example: active denial applications, communications applications, energy transmission applications, electronics disruption applications, combinations thereof, and/or the like. As used herein, the term "active denial" and variations thereof are generally intended to include any system configured to direct electromagnetic radiation at a target, such as, for example, in non-lethal anti-personnel applications.

A detailed description of an exemplary application, namely an active denial system, is provided as a specific enabling disclosure that may be generalized to any application of the disclosed system, device and method for a waveguide in accordance with various embodiments of the present invention.

Figure 1:
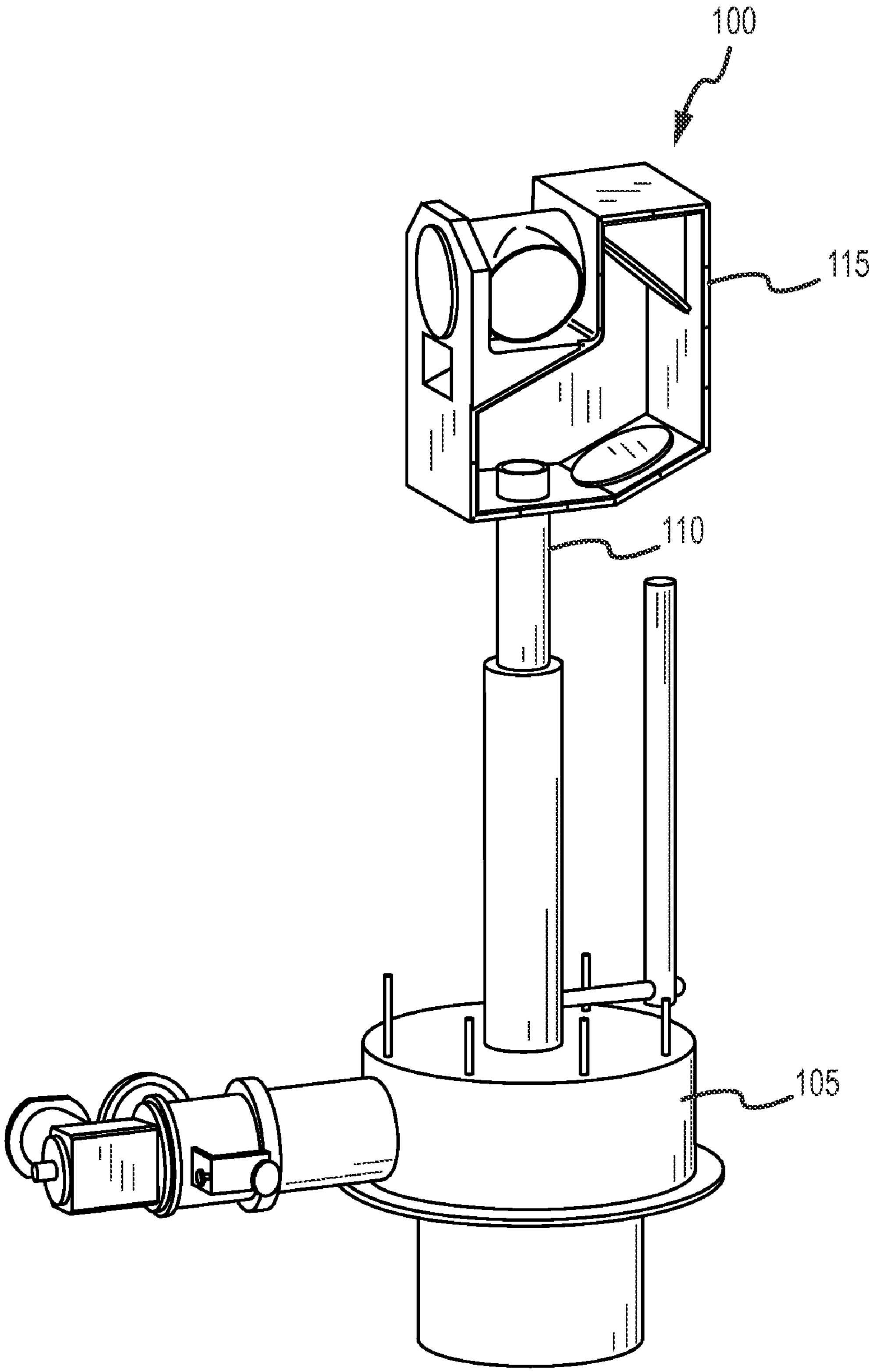
FIG. 1 representatively illustrates a directed energy system in accordance with an exemplary embodiment of the present invention.

As generally depicted in FIG. 1, a representative embodiment of the present invention provides a system 100 for a housing 115. The housing 115 may be coupled to an electromagnetic wave beam generator 105. The generator 105 may comprise a tube 110 which may be coupled to the housing 115. By virtue of the coupling with the tube 110, the wave beam produced by generator 105 may be directed from the generator 105 to the housing 115.

As used herein, the term "wave beam" and variations thereof are generally intended to refer to a configuration of electromagnetic energy comprising an axis of propagation. A wave beam may be comprised of waves, photons, electrons, α (alpha) particles, β (beta) particles, γ (gamma) particles, combinations thereof, and/or the like. A wave beam may be configured to have a substantially constant energy density along the axis of propagation. A wave beam may be configured in various embodiments and comprise various properties including: a specified frequency, a specified wavelength, a specified amplitude, a specified mode, a specified duration, combinations thereof, and/or the like.

A generator 105 may be suitably configured to provide a wave beam. A wave beam may be produced using a variety of methods and systems. For example, a generator 105 may comprise a magnetron, a klystron, a gyrotron, a cyclotron, a tokamak, combinations thereof, and/or the like. The properties of a wave beam, such as frequency, amplitude, wavelength, mode, and duration may be substantially related to the generator 105 used to produce the wave beam.

A generator 105 may be suitably configured from various materials. The design parameters of the system 100 may influence the choice of materials. For example, the materials suitable for a magnetron may not be suitable for a gyrotron. A given generator 105 may comprise any suitable alloys, polymers, ceramics, combinations thereof, and/or the like.

A generator 105 may be suitably configured to include various geometries. The design parameters of the system 100 may influence the geometry of the system. For example, if the system 100 is to produce a high power microwave frequency wave beam, a gyrotron may be more suitable than a magnetron. Since a gyrotron generally has a different geometry than a magnetron, the size of the gyrotron may influence the geometry of a generator 105. Taking into account these and/or other design considerations, a generator 105 may comprise any suitable geometry such as a substantially conic section, substantially ellipsoidal, substantially polyhedral, substantially cylindrical, substantially toroidal, combinations thereof, and/or the like.

A generator 105 may comprise various elements. For example, if a generator 105 comprises a gyrotron, the elements may be substantially different than if a generator 105 comprises a tokamak. A generator 105 may comprise a power source, a cooling system, a tube 110, a resonant cavity, combinations thereof, and/or the like.

A generator 105 may be suitably configured in various embodiments. For example, a generator 105 may be suitably configured to provide a wave beam having a specified frequency, a specified amplitude, a specified wavelength, a specified mode, combinations thereof, and/or the like. As another example, a generator 105 may be suitably configured to provide a particular wave beam over a specified period of time. As yet another example, a generator 105 may be suitably configured for applications in transportation devices such as trucks.

A tube 110 may be suitably configured to deliver a specified wave beam. For an electromagnetic wave beam generator 105 such as a gyrotron, a substantially cylindrical structure such as a vacuum tube may be an inherent component of the system. As such, the tube 110 may be a vacuum tube substantially integrated with the generator 105 for these systems. For a generator 105 in which a vacuum tube 110 is not an inherent component, the tube 100 may instead be an attachment configured to direct the output of the generator 105 to a housing 115.

A tube 110 may be suitably configured to comprise various materials and geometries. The design parameters for the system 100 such as the power required, the duration of power requirements, transportability of the system, the maximum allowable volume of the system, as well as other factors, may influence the materials and geometries of the tube 110. A tube 110 may comprise various materials including alloys, polymers, ceramics, combinations thereof, and/or the like. A tube 110 may comprise various geometries including a substantially conic section, substantially ellipsoidal, substantially polyhedral, substantially toroidal, substantially cylindrical, combinations thereof, and/or the like.

A tube 110 may be suitably configured to comprise various elements and/or subsystems. For example, a tube 110 may comprise an outer surface configured to prevent transmission of material from the interior of the tube 110 and transmission of material into the tube 110. As another example, a tube 110 may comprise a cooling system configured to remove heat from the tube 110. As yet another example, a tube 110 may comprise a coupling mechanism configured to couple with a housing 115.

Figure 2:
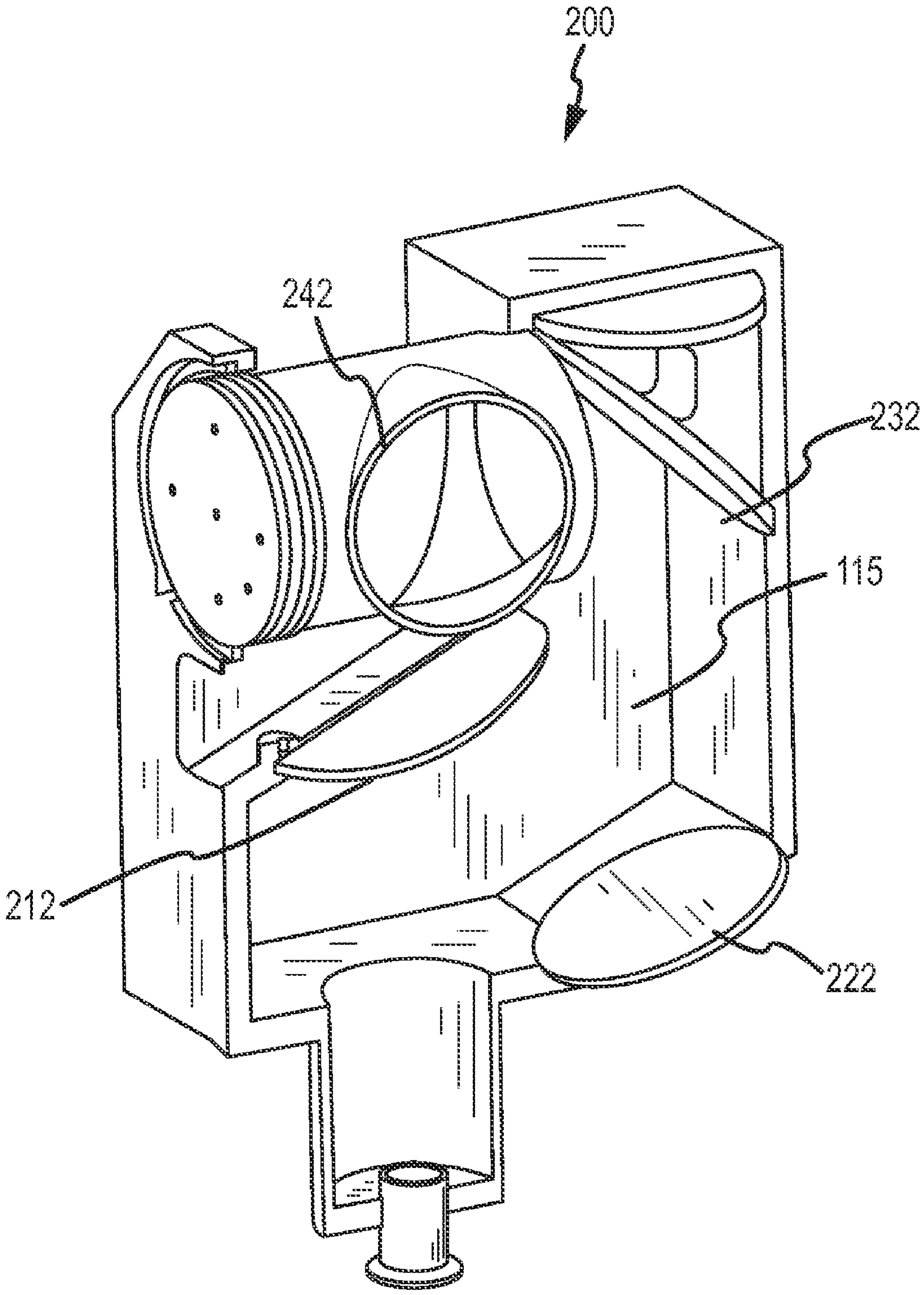
FIG. 2 representatively illustrates a waveguide within a housing in accordance with an exemplary embodiment of the present invention.

Referring now to FIG. 2, a view of an embodiment for a waveguide 200 within a housing 115. The waveguide 200 may comprise a plurality of reflective surfaces 212/222/232/242 configured to couple to the housing 115. A first reflective surface 212 may be configured to receive the output wave beam of a generator 105, FIG. 1. A second reflective surface 222 may be configured to receive the wave beam as reflected by the first reflective surface 212. A third reflective surface 232 may be configured to receive the wave beam as reflected by the second reflective surface 222. A fourth reflective surface 242 may be configured to receive the wave beam as reflected by the third reflective surface 232. The fourth reflective surface 242 may be configured to direct the wave beam to an antenna (not shown).

A waveguide 200 may be suitably configured to modify an incident wave beam. For example, a waveguide 200 may be configured to modify an incident wave beam to produce a resultant wave beam having: linear polarization, a modified axis of propagation, convergence, divergence, a smoothed wave profile, combinations thereof, and/or the like.

A waveguide 200 may be configured to modify, an incident wave beam according to the properties of the waveguide 200. For example, at least one of the reflective surfaces 212/222/232/242 may be configured to provide mode conversion of an incident wave beam, conditioning of an incident wave beam, convergence of an incident wave beam, selective direction of an incident wave beam, combinations thereof, and/or the like. Design of a waveguide 200 may relate to the properties of the incident wave beam, properties of the resultant wave beam, properties of the constituent elements of the waveguide, combinations thereof, and/or the like.

A waveguide 200 may be configured according to various geometries and dimensions. For example, the reflective surfaces 212/222/232/242 may be suitably aligned for various purposes including: to provide a selected angle of reflection, to provide a selected distance between a pair of reflective surfaces, for accommodation within a selected housing 115, combination thereof, and/or the like. The geometries and dimensions of a waveguide 200 may be related to the geometries and dimensions of a reflective surface 212/222/232/242, the geometries and dimensions of a housing 115, the properties of an incident wave beam, combinations thereof, and/or the like.

A reflective surface 212/222/232/242 may be configured to substantially reflect an incident wave beam. For example, a reflective surface 212/222/232/242 may be configured to modify a reflected incident wave beam, the modification including: convergence, divergence, mode conversion, a modified axis of propagation, collimation, combinations thereof, and/or the like. The surface properties of a reflective surface 212/222/232/242 may be configured to provide a specified angle of incidence, a specified alignment with respect to other reflective surfaces, a specified alignment with respect to other systems such as an antenna, a specified efficiency, combinations thereof, and/or the like.

A reflective surface 212/222/232/242 may substantially comprise various geometries and dimensions. For example, a reflective surface 212/222/232/242 may comprise various surface geometries including: a conic sectional, concavity, convexity, polyhedral, ellipsoidal, toroidal, cylindrical, combinations thereof, and/or the like. As another example, a reflective surface 212/222/232/242 may comprise various dimensions according to various design parameters including: the properties of an incident wave beam, the internal surface geometry of a housing 115, the material properties of a given reflective surface 212/222/232/242, the geometry of a given reflective surface 212/222/232/242, the properties of an antenna configured to receive the resultant wave beam, combinations thereof, and/or the like.

A reflective surface 212/222/232/242 may be configured according to a specified equation. For example, a first reflective surface 212, a second reflective surface 222, and a third reflective surface 232 may be consecutively aligned within a waveguide 200. The first and third reflective surfaces 212/232 may comprise substantially paraboloidal reflective surfaces. The second reflective surface 222 may comprise a corrugated reflective surface. The first and third reflective surfaces 212/232 may be configured to have focal lengths configured to maintain symmetry of an incident wave beam according to the equation:

$$\frac{F_1}{F_3} = \sin(\beta)$$

where $F_1$ is the focal length of a first reflective surface 212, $F_3$ is the focal length of a third reflective surface 232, and β is the angle of incidence upon the second reflective surface 222. As another example, a first reflective surface 212 and a third reflective surface 232 may be configured to maintain symmetry of an incident wave beam according to the equation:

$$F_3 = F_1\frac{(M^2+1)}{2M}$$

where $F_3$ is the focal length of a third reflective surface 232, $F_1$ is the focal length of a first reflective surface 212, and M is the desired magnification of an incident wave beam. As yet another example, a first reflective surface 212 may be configured to maintain symmetry and polarization of an incident wave beam by including an axis of symmetry, oriented at an incident wave beam, wherein the angle is about 2 arctan (1/M), where M is the desired magnification of an incident wave beam.

A reflective surface 212/222/232/242 may be configured from various materials and comprise various properties. For example, a reflective surface 212/222/232/242 may comprise a polished surface of an otherwise dull material, a surface of a substantially reflective material, a reflective coating on an otherwise dull material, combinations thereof, and/or the like. As yet another example, a reflective surface 212/222/232/242 may comprise a surface having various reflective properties including: retroreflection, diffuse reflection, specular reflection, combinations thereof, and/or the like. As yet another example, a reflective surface 212/222/232/242 may comprise various properties including a specified emissivity, a specified reflectance, a specified conductivity, combinations thereof, and/or the like.

A plurality of reflective surfaces 212/222/232/242 may comprise various designs, materials, and geometries among the reflective surfaces 212/222/232/242. For example, a first reflective surface 212 may be dedicated to conditioning of an incident wave beam while a second reflective surface 222 may be dedicated to mode conversion of an incident wave beam. As another example, a plurality of reflective surfaces 212/232 may be dedicated to beam conditioning.

A reflective surface 212/222/232/242 may be configured to couple to a housing 115. For example, a reflective surface 212/222/232/242 may be a portion of a structure configured to couple to the inside of a housing 115. This coupling may comprise various methods and/or structures including adhesives, fasteners, compliant interfaces, high friction surfaces, welding, combinations thereof, and/or the like. As another example, a reflective surface 212/222/232/242 may be a portion of the housing 115.

An antenna may be configured to direct the output of the waveguide 200 to a target. For example, an antenna may be configured for use with particular targets, such as crowd control. As another example, an antenna may, be configured for use at particular ranges.

An antenna may comprise anti suitable materials. Whether a given material is suitable may relate to the operating conditions of the antenna as well as the intended targets for the system 100, FIG. 1. For example, if the antenna is intended to operate for a long period of time in open air conditions, it may be desirable to avoid materials that corrode under such conditions. As another example, if the antenna is intended to operate in high stress conditions such as in mobile operations, it may be desirable to avoid materials that tend to fail under such conditions. As yet another example, if an intended target is susceptible to a given wave beam, it may be desirable to avoid materials that substantially absorb the wave beam. With these and/or other design considerations taken into account, an antenna may be comprised of any suitable materials including alloys, polymers, ceramics, combinations thereof, and/or the like.

An antenna may comprise any suitable geometries and dimensions. Factors such as the operating conditions of the antenna, materials comprising the antenna, as well as intended targets may influence the geometries and/or dimensions of an antenna. For example, it may be desirable to configure the geometry of the antenna corresponding to the properties of a corresponding wave beam. As another example, it may be necessary to modify the dimensions of an antenna such that the relevant properties of the material comprising the antenna are taken into account. With consideration of these and/or other design features, an antenna may comprise any suitable geometry including a substantially conic section, substantially ellipsoidal, substantially polyhedral, substantially toidal, substantially cylindrical, combinations thereof, and/or the like.

An antenna may comprise various substructures and/or subsystems. For example, an antenna may comprise a Cassegrain antenna comprising a plurality of reflective surfaces. As another example, an antenna may comprise a selectively adjustable couple configured to selectively modify the disposition of the antenna. The term "couple", when used as a noun, has the conventional meaning of "something that links or joins two things together". The selectively adjustable couple may be, for example, a gimbal, a universal joint, a rack and pinion, pluralities and/or combinations thereof, and/or the like. As yet another example, an antenna may comprise a radome configured to transmit the output of the antenna and further configured to prevent contamination of the antenna surface.

An antenna may be suitably configured in various embodiments. For example, an antenna may be configured for use with a certain wave beam, such as a wave beam having a specified polarization, wavelength, amplitude, combinations thereof, and/or the like. As another example, an antenna may be configured for convergence of an incident wave beam, divergence of an incident wave beam, substantially unmodified transmission of an incident wave beam, combinations thereof, and/or the like.

Figure 3:
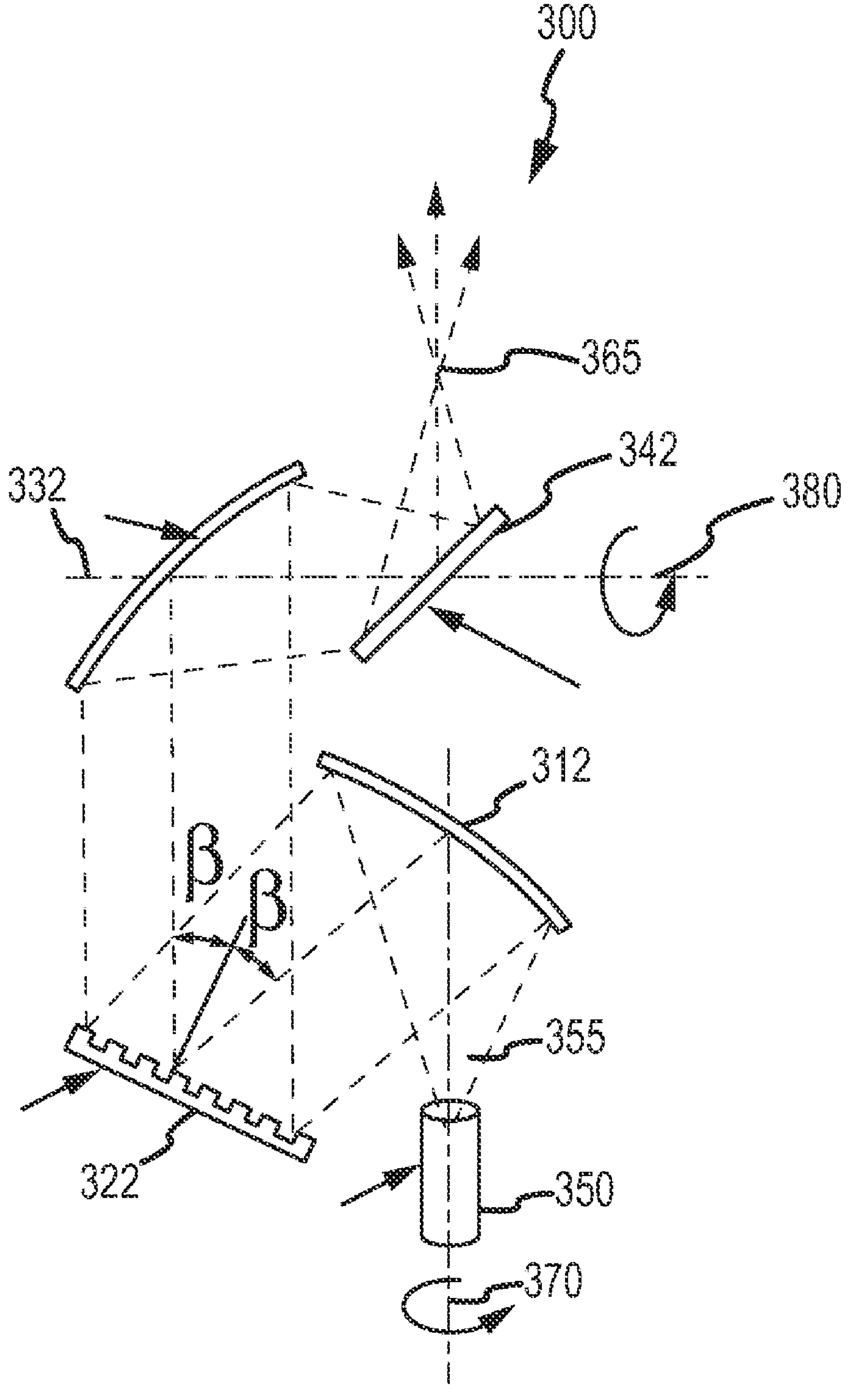
FIG. 3 representatively illustrates a schematic for a waveguide in accordance with an exemplary embodiment of the present invention.

Referring now to FIG. 3, a schematic 300 for an embodiment of a waveguide 200, FIG. 2. The waveguide 200 may comprise a plurality of reflective surfaces 312/322/332/342. The reflective surfaces 312/322/332/342 may be configured to direct and/or modify the output of a wave beam generator 105, FIG. 1, such that the modified wave beam 365, as reflected from the waveguide 200, is substantially modified with respect to the initial wave beam 355. The waveguide 200 may be configured to selectively rotate about the principal axis 370 of the wave beam generator 105. A reflective surface 342 may be configured to selectively rotate about an axis 380 defined by the housing 115, FIG. 1.

An initial wave beam 355 may be configured to provide energy for manipulation by the waveguide 200. The properties of an initial wave beam 355 may relate to the wave beam generator 105. For example, a given wave beam generator 105 may have a substantially fixed output wave beam. As another example, a given wave beam generator 105 may have a selectable range of output wave beams.

An initial wave beam 355 may be suitably configured in various embodiments. For example, an initial wave beam 355 may be configured as a substantially constant stream of electromagnetic radiation. As another example, an initial wave beam 355 may be configured as a substantially intermittent burst of electromagnetic radiation. An initial wave beam 355 may comprise various frequencies, wavelengths, amplitudes, modes, durations, combinations thereof, and/or the like.

A modified wave beam 365 may be configured for a given application. For example, the waveguide 200 may be configured to produce a modified wave beam 365 having a substantially linear polarization for use with a particular antenna. As another example, the waveguide 200 may be configured to produce a modified wave beam 365 having a specified energy density to transfer energy from the generator 105 to a target.

A modified wave beam 365 may have properties relating to the waveguide 200 and the wave beam generator 105. For example, the energy of the modified wave beam 365 may be lower than the energy emitted by the generator 105. As another example, the polarization of the modified wave beam 365 may have characteristics such as convergence, conditioning, and/or mode related to the waveguide 200.

A modified wave beam 365 may be suitably configured in various embodiments. For example, the modified wave beam 365 may be configured for use with a given antenna. As another example, the modified wave beam 365 may be configured to produce a specified effect on a particular target.

The principal axis 370 of the generator 105 may be an axis about which a housing 115 is configured to rotate. The principal axis 370 may comprise the principal axis of the tube 350, which may be similar to tube 110 as shown in FIG. 1, and/or the axis of propagation of the initial wave beam 355. The principal axis of the generator 105 may be coincident with the principal axis of the tube 350 and/or the axis of propagation of the initial wave beam 355.

The axis 380 defined by the housing 115 may be defined by a selectively adjustable portion of the housing 115. For example, the housing 115 may include a coupling configured to receive a selectively adjustable reflective surface coupling. By insertion of the selectively adjustable reflective surface coupling, a reflective surface may be selectively aligned about an axis 380 defined by the housing 115.

Figure 4:
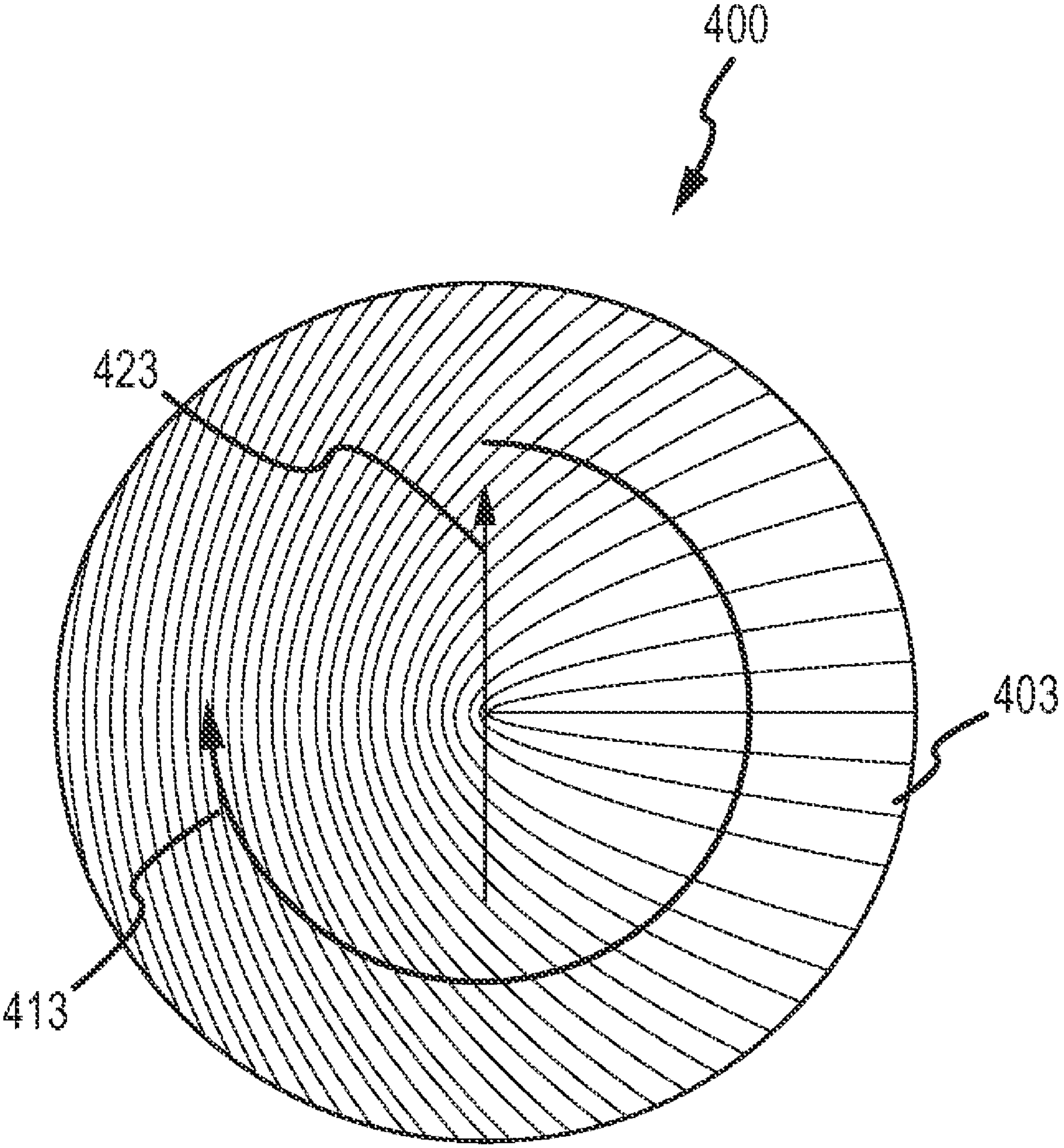
FIG. 4 representatively illustrates a top view of a reflective surface in accordance with an exemplary embodiment of the present invention.

Referring now to FIG. 4, a top view of an embodiment for a reflective surface 400 configured for mode conversion. The reflective surface 400 may comprise a corrugated surface 403. The corrugated surface 403 may be configured to convert an incident circumferentially polarized wave beam 413 to a reflected substantially linearly polarized wave beam 423.

The corrugated surface 403 may be configured to convert the mode of an incident wave beam. For example, the corrugated surface 403 may comprise ¼ wavelength grooves configured to convert the mode of an incident wave beam from circumferentially polarized to linearly polarized. The corrugated surface 403 may be suitably configured to provide grooves configured for various wavelengths and configured to convert the mode of incident wave beams having various characteristics.

The corrugated surface 403 may be comprised of various materials and geometries. For example, the corrugated surface 403 may comprise a coating applied to the reflective surface 400, a conceptually distinct portion of the reflective surface 400, a region of the reflective surface, combinations thereof, and/or the like. The corrugated surface 403 may be comprised of any suitably reflective material including alloys, polymers, ceramics, combinations thereof, and/or the like. The corrugated surface 403 may comprise various geometries including a substantially conic section, substantially ellipsoidal, substantially polyhedral, substantially toroidal, substantially cylindrical, combinations thereof, and/or the like.

The corrugated surface 403 may be suitably configured in various embodiments. For example, the corrugated surface 403 may be configured with surface characteristics corresponding to the properties of such an output wave beam to convert the output wave beam of a specified generator 105, FIG. 1. A specified generator 105 may be configured to produce a wave beam having a fixed wavelength. The corrugated surface 403 may be configured to correspond to that fixed wavelength. As another example, a reflective surface 400 may have a plurality of corrugated surfaces 403 which may be selectively aligned within the waveguide 200, FIG. 2. In the event that a corrugated surface 403 with particular characteristics is desired, the corresponding corrugated surface 403 may be aligned within the waveguide 200.

The incident circumferentially polarized wave beam 413 may be the wave beam as produced by the wave beam generator 105. The substantially linearly polarized wave beam 423 may be the wave beam as modified for use in a directed energy application.

Figure 5:
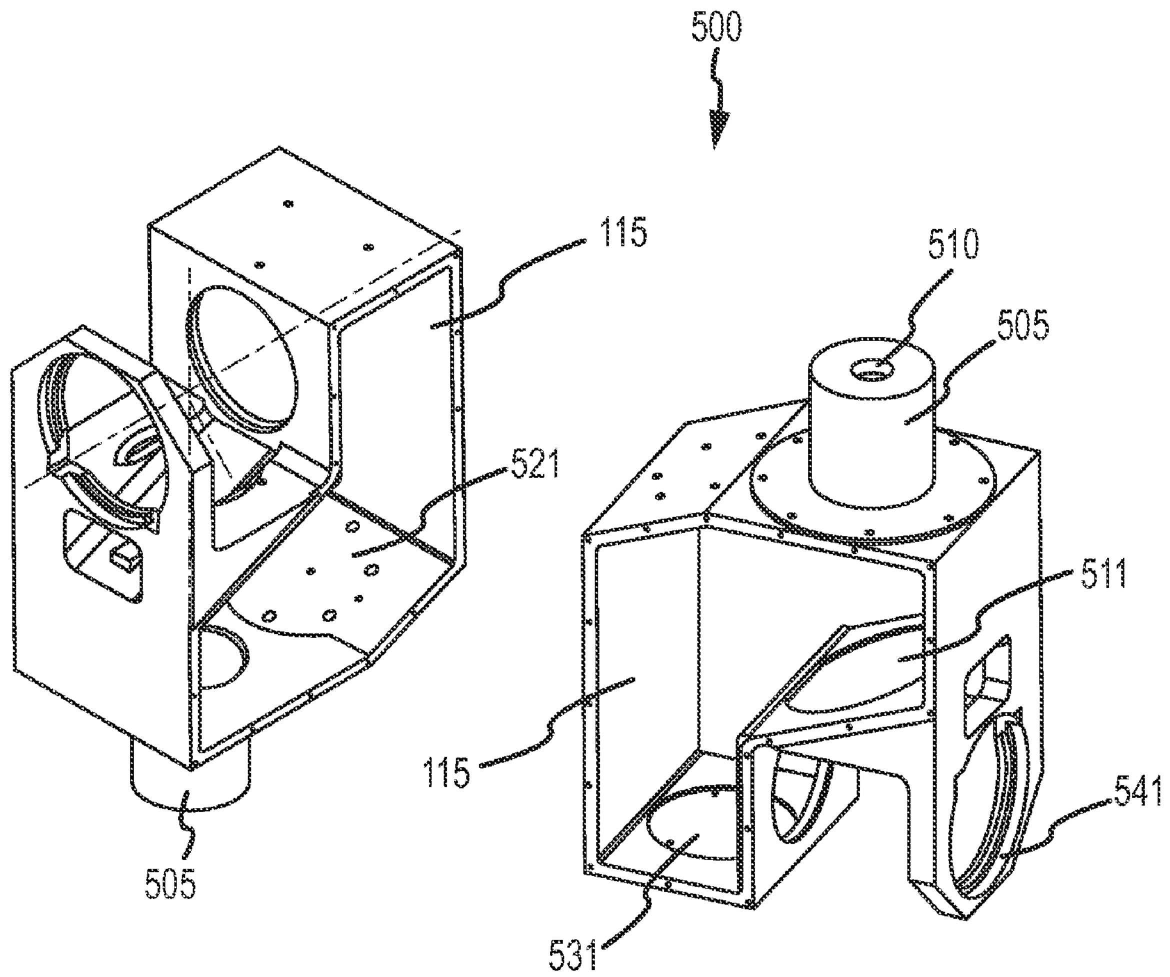
FIG. 5 representatively illustrates a view of a housing in accordance with an exemplary embodiment of the present invention.

Referring now to FIG. 5, a view 500 of an embodiment for a housing 115. The housing 115 may comprise a generator couple 505 configured to couple the housing 115 to a generator 105, FIG. 1. The generator couple 505 may comprise an aperture 510. The aperture 510 may, be configured to transmit a wave beam from a coupled generator 105 into the housing 115. The housing 115 may further comprise an internal surface. The internal surface may comprise a plurality of reflective surface couples 511/521/531/541. A first reflective surface couple 511 may be configured to couple to a first reflective surface 212, FIG. 2. A second reflective surface couple 521 may be configured to couple to a second reflective surface 222 FIG. 2. A third reflective surface couple 531 may be configured to couple to a third reflective surface 232, FIG. 2. A fourth reflective surface couple 541 may be configured to couple to a fourth reflective surface 242, FIG. 2, and/or a selectively rotatable mount configured to couple to a fourth reflective surface 242.

A housing 115 may be suitably configured to align a plurality of reflective surfaces 212/222/232/242 and/or suitably configured to prevent contamination to the reflective surfaces 212/222/232/242 by, for example, debris and incident external radiation. In addition, a housing 115 may be configured to provide a pressurized compartment for at least the partial containment of a waveguide 200, FIG. 2. Further, a housing 115 may be configured to provide a compartment having a specified environment, such as a particular fluid, within the housing 115.

A housing 115 may comprise various materials. A variety of factors relate to whether a particular material is suitable for use in a housing 115. For example, if the system 100 is to be employed in a salt water environment, certain materials which tend to corrode in such an environment may not be suitable for use in the housing 115. As another example, if the system 100 is to be used in circumstances tending to introduces stresses into the housing 115, certain materials may not be suitable for the stress conditions. In view of these and/or other design considerations, a housing 115 may comprise any suitable materials such as alloys, polymers, ceramics, combinations thereof, and/or the like.

A housing 115 may comprise various geometries. The geometry of a housing 115 may relate to the materials comprising the housing 115, the environment in which the housing 115 is to operate, combinations thereof, and/or the like. In view of these and/or other design considerations, a housing 115 may comprise any suitable geometry including a substantially conic section, substantially ellipsoidal, substantially, polyhedral, substantially toroidal, substantially cylindrical, combinations thereof, and/or the like.

A housing 115 may comprise various constituent elements. For example, a housing 115 may be comprised of a plurality of pieces coupled together to form a housing 115. In such an embodiment, the housing 115 would comprise various constituent elements such as a cover plate configured to form an enclosed space within the housing 115.

A housing 115 may comprise a substantially fixed portion configured to couple to a plurality of reflective surfaces 212/222/232/242 and a selectively rotatable mount configured to couple to a reflective surface 242. In this configuration, the selectively rotatable mount may be configured to selectively rotate a reflective surface 242 while maintaining alignment of the reflective surface 242 within a waveguide 200. The selectively rotatable mount may couple to the substantially fixed portion via a couple 541. The selectively rotatable mount may comprise various gaskets, retainer rings, radomes, combinations thereof, and/or the like configured to facilitate rotation of the rotatable mount and/or operation of a reflective surface 242 within a waveguide 200.

A housing 115 may be suitably configured in various embodiments. For example, a housing 115 may be configured to rotate about and/or translate along the principal axis of a coupled generator 105. As another example, a housing 115 may define an axis of rotation for at least one reflective surface. As yet another example, a housing 115 may be configured to substantially prevent contamination of the waveguide 200, for example, by debris. As yet another example, a housing 115 may be configured to facilitate alignment of a waveguide 200 within the housing 115.

A generator couple 505 may be suitably configured to provide alignment of the waveguide 220 with respect to an incident wave beam from the wave beam generator 105. For example, a generator couple 505 may be configured to align the housing 115 with the principal axis of the generator 105. With such an alignment, the output of the wave beam generator 105 may be suitably aligned for reflection by the waveguide 200 within the housing 115.

A generator couple 505 may comprise various materials. Various design factors such as stress conditions as between a housing 115 and a tube 110, FIG. 1, the environment in which the system 100, FIG. 1, is to operate, etc., may relate to whether a given material is suitable for a generator couple 505. A generator couple may comprise a portion of a housing 115, a distinct structure coupled to a housing 115, combinations thereof, and/or the like. In view of these and/or other design considerations, a generator couple 505 may comprise any suitable materials including alloys, polymers, ceramics, combinations thereof, and/or the like.

A generator couple 505 may comprise various geometries. Various design factors such as stress conditions as between a housing 115 and a tube 110, the material to be used in the generator couple 505, etc., may relate to whether a given geometry is suitable for a generator couple 505. With these and other design considerations taken into account, a generator couple 505 may comprise any suitable geometry including a substantially conic sections substantially ellipsoidal, substantially polyhedral, substantially toroidal, substantially cylindrical, combinations thereof, and/or the like.

A generator couple 505 may be comprised of various constituent elements. For example, the generator couple 505 may include a bearing configured for rotation of the housing 115 about the principal axis of the generator 105. The bearing may comprise a gasket, a retainer ring, a one ball bearing, a one roller bearing, a lubricant, pluralities and/or combinations thereof, and/or the like. As another example, the generator couple 505 may include an optical encoder configured for selective rotation of the housing 115 about the principal axis of the generator 105. The optical encoder may be further coupled to a power source and/or a processor.

A generator couple 505 may be suitably configured in various embodiments. For example, a generator couple 505 may couple a housing 115 to a generator 105 such that the housing 115 is substantially fixed with respect to the generator 105. As another example, a generator couple 505 may couple a housing 115 to a generator 105 such that the housing 115 may selectively rotate about the principal axis of the generator 105.

An aperture 510 may be suitably configured to define the entry point of a wave beam into a housing 115. An aperture 510 may comprise a hollow portion of a generator couple 505 such that the principal axis of a generator 105 passes through the aperture 510. Regardless of whether an aperture 510 comprises a void or whether the aperture comprises a structure configured to engage a wave beam, the aperture 510 may be configured to transmit at least a portion of a wave beam into the housing 115.

An aperture 510 may comprise various materials. For example, an aperture 510 and generator couple 505 may comprise substantially distinct portions of the housing 115. As another example, an aperture 510 and generator couple 505 may comprise substantially dissimilar materials. As yet another example, an aperture 510 may comprise a material having a substantially low emissivity so as to minimize loss of energy of a wave beam through the aperture 510. Taking these and/or other design considerations into account, an aperture 510 may comprise any suitable material including alloys, polymers, ceramics, combinations thereof, and/or the like.

An aperture 510 may comprise various geometries. For example, an aperture 510 may comprise a substantially cylindrical hollow portion of the generator couple 505. As another example, if an aperture 510 comprises structures configured to engage a wave beam, the aperture 510 may comprise various geometries suited to engagement. With these and/or other design considerations taken into account, an aperture 510 may comprise any suitable geometry including a substantially conic section, substantially ellipsoidal, substantially polyhedral, substantially toroidal, substantially cylindrical, combinations thereof, and/or the like.

An aperture 510 may comprise various constituent elements. For example, if an aperture 510 comprises a substantially hollow portion of the generator couple 505, the aperture may comprise a substantially streamlined surface. As another example, if an aperture 510 comprises a structure configured to engage a wave beam, the aperture 510 may be configured to include, for example, a refractive lens, a filter, a subdividing element, a coupling for a structure configured for engaging a wave beam, combinations thereof, and/or the like.

An aperture 510 may be suitably configured in various embodiments. For example, the aperture 510 may include a filter configured to selectively transmit a wave beam into the housing 115. As another example, the aperture 510 may comprise a region defined by the edges of the generator couple 505. As yet another example, the aperture 510 may comprise distinct structures configured for operation with an incident wave beam. In such an embodiment, the aperture may comprise a filter, a refractive element, a subdividing structure, combinations thereof, and/or the like.

A reflective surface couple 511/521/531/541 may be suitably configured to provide a couple for a reflective surface 212/222/232/242. Considering that effectiveness of the waveguide 200 is related to alignment of the waveguide 200, a reflective surface couple 511/521/531/541 may be configured to provide substantially fixed alignment of a reflective surface 212/222/232/242 within the housing 115. If the waveguide 200 is to include one or more selectively adjustable reflective surfaces 212/222/232/242, one or more corresponding reflective surface couples 511/521/531/541 may be configured to selectively secure one or more selectively adjustable reflective surfaces 212/222/232/242 within the housing 115.

A reflective surface couple 511/521/531/541 may comprise various materials. For example, a reflective surface couple 511/521/531/541 may comprise a portion of the internal surface of the housing 115 configured to receive a reflective surface. In such a configuration, a reflective surface couple 511/521/531/541 and the housing 115 may comprise substantially similar materials. If a reflective surface couple 511/521/531/541 is a substantially distinct structure configured to couple a reflective surface 212/222/232/242 to the surface of the housing 115, the reflective surface couple 511/521/531/541 and the housing 115 may comprise substantially dissimilar materials. In view of these and/or other design considerations, a reflective surface couple 511/521/531/541 may comprise any suitable material including alloys, polymers, ceramics, combinations thereof, and/or the like.

A reflective surface couple 511/521/531/541 may comprise various geometries. For example, if a reflective surface 212/222/232/242 is configured to couple to the housing 115 with a fastener, the reflective surface couple 511/521/531/541 may be configured to include a structure configured to receive the fastener. As another example, if a reflective surface 212/222/232/242 is configured to couple to the housing 115 via a compliant structure, the reflective surface couple 511/521/531/541 may comprise a first geometry prior to coupling of a reflective surface 212/222/232/242 and a second geometry following coupling of a reflective surface 212/222/232/242. In view of these and/or other design considerations, a reflective surface couple 511/521/531/541 may comprise an), suitable geometry including a substantially conic section, substantially ellipsoidal, substantially polyhedral, substantially toroidal, substantially cylindrical, combinations thereof, and/or the like.

A reflective surface couple 511/521/531/541 may comprise various constituent elements. For example, if the reflective surface couple 511/521/531/541 is configured to couple to a reflective surface 212/222/232/242 via a fastener, the reflective surface couple 511/521/531/541 may comprise a structure configured to receive the fastener. As another example, if the reflective surface couple 511/521/531/541 is configured to couple to a reflective surface 212/222/232/242 via a compliant fastener, the reflective surface couple 511/521/531/541 may comprise at least one compliant fastener. As yet another example, if the reflective surface couple 511/521/531/541 is configured to selectively engage a coupled reflective surface 212/222/232/242, the reflective surface couple 511/521/531/541 may comprise rotational and/or translational structure, such as a gimbal, a universal joint, and/or a rack and pinion, to modify, the position of a coupled reflective surface 212/222/232/242.

Figure 6:
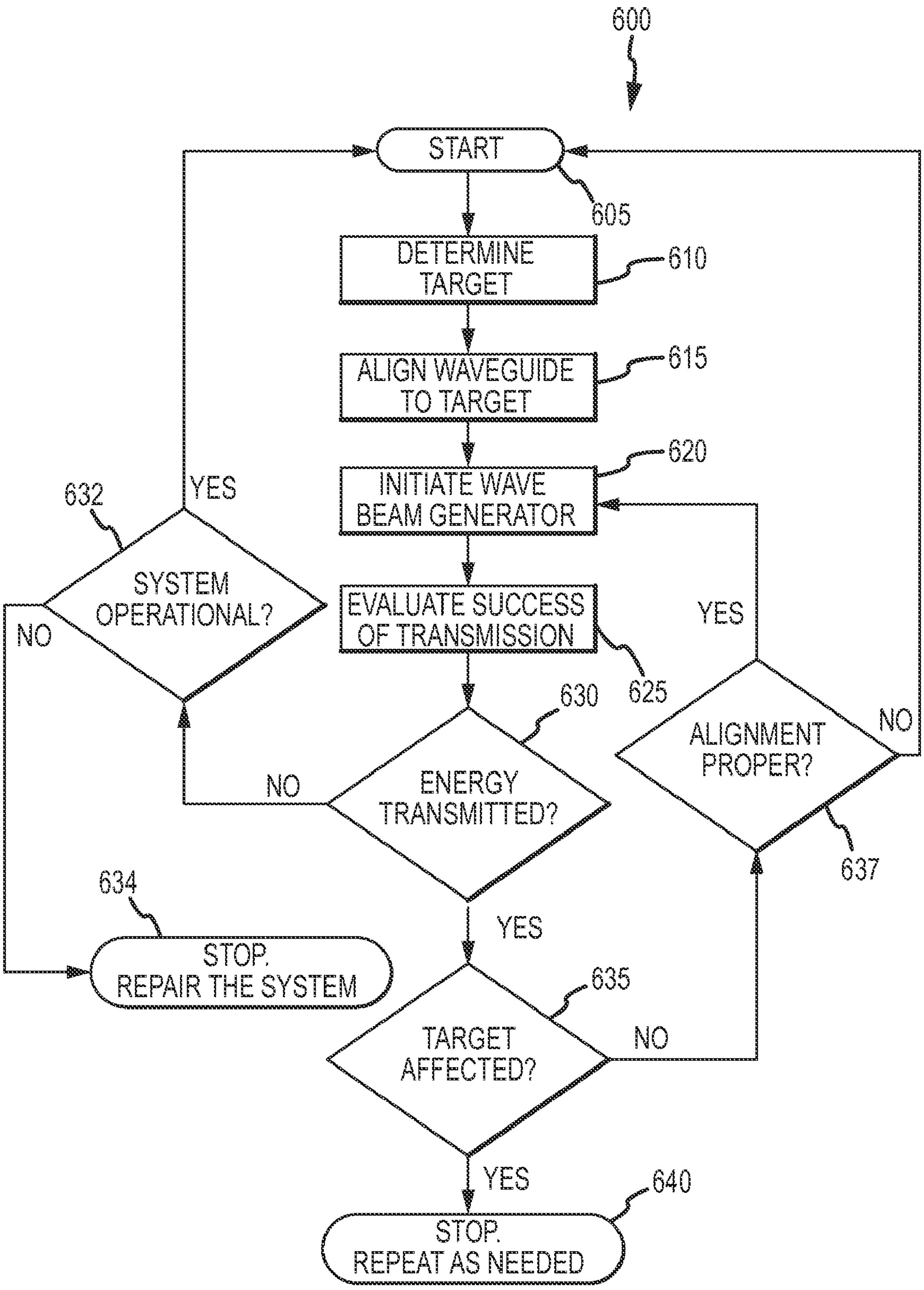
FIG. 6 representatively illustrates a flowchart for operation of the system in accordance with an exemplary embodiment of the present invention.

Referring now to FIG. 6, a flowchart (600) illustrating an embodiment for operation of the system 100, FIG. 1. As a first step, the system 100 may start or be initialized (605), as by deploying the system 100 in the vicinity of a battlefield. Next, a target may be determined (610). The waveguide 200, FIG. 2, may then be aligned to the target (615). After alignment of the waveguide 200, the wave beam generator 105, FIG. 1, may be initiated (620). The target may then be analyzed to determine the success of the operation (625).

One indicia of success may be whether energy was transmitted by the system 100 (630). If energy was not transmitted, i.e. NO condition, it may be necessary to investigate whether the system 100 is operational (632). If the system 100 is not operational, i.e. NO condition, it may be necessary to stop and repair the system 100 (634). If the system 100 is operational, i.e. YES condition, it may be necessary to repeat previous steps starting at step (605).

If energy was transmitted, i.e. YES condition, the next question may be whether the target was affected (635). If the target was not affected, i.e. NO condition, it may be necessary to evaluate alignment of the waveguide 200 (637). If alignment is not proper, i.e. NO condition, it may be necessary to repeat previous steps starting at step (605). If alignment is proper for the intended target, i.e. YES condition, the wave beam may be initiated (620) again. If the target was affected, i.e. YES condition, the system 100 may have been at least partially effective (640).

Initialization of the system 100 (605) may be defined as presentation of the system 100 within the vicinity of a target. Presentation of the system 100 within the vicinity of the target may be achieved either by bringing the system 100 to the target or movement of the target within range of the system 100. Initialization may include removal of storage equipment to permit alignment of the system 100 and initiation of the generator 105, FIG. 1.

Determination of a target (610) may be performed using any suitable methods and/or instruments for targeting. The target may be analyzed using systems such as the naked eye, imaging systems, radar, sonar, satellite positioning systems, combinations thereof, and/or the like For moving targets, an estimated trajectory may be produced using systems such as processors, hardware, and/or software. In the event that both the target and the system 100 are moving, these factors may be included in the targeting calculation.

Alignment of the waveguide 200 (615) may be performed using any suitable methods and/or instruments for alignment. For example, if the housing 115, FIG. 1, is moveable with respect to the generator 105, alignment of the waveguide 200 may include rotation and/or translation of the housing 115 with respect to the generator 105. As another example, if a reflective surface 212/222/232/242, FIG. 2, is selectively moveable with respect to the housing, alignment of the waveguide 200 may include rotation and/or translation of a reflective surface 212/222/232/242 with respect to the housing 115.

Initiation of the generator 105 (620) may be performed by causing the generator 105 to produce a wave beam. The generator 105 may be initiated by powering on the generator 105, by adjusting the generator 105 from a standby status, combinations thereof, and/or the like. Initiation of the generator 105 generally relates to the nature of the generator itself. For example, a gyrotron may have a different initiation procedure than a magnetron.

The target may be analyzed (625) using any suitable methods and/or techniques. Systems including the naked eye, imaging systems, radar, sonar, satellite positioning systems, remote sensing, combinations thereof, and/or the like may be used to analyze the a target. For example, if the system 100 is configured for crowd control, a dispersed crowd may be observed by the naked eye. As another example, if the system 100 is configured to disable an electrical transformer, the disabled electrical transformer may be observed by infrared imaging.

The success of energy transmission may be analyzed (630) using any suitable methods and/or techniques. For example, the effects of an emitted wave beam, such as atmospheric scintillation, may be visible to the naked eye. In such a scenario, transmission of energy may be determined by visual verification. As another example, the effects of an emitted wave beam, such as fluctuations in atmospheric pressure, may be perceptible by the human ear. In such a scenario, transmission of energy may be so determined. As yet another example, if the effects of an emitted wave beam are not perceptible by human senses, devices such as imaging systems, sonar, radar, satellite positioning systems, combinations thereof, and/or the like may be employed to determine if energy transmission was successful.

One indicia of successful energy transmission may be whether the system 100 is operational. If not operational, the system 100 may be repaired (634). Repair of the system 100 generally relates to the source of the error. For example, if the housing 115 had a detrimental crack, repair of the crack may render the system 100 operational. As another example, if the generator 105 has become disconnected from the power source, reconnection of the generator 105 with a power source may render the system 100 operational.

If the system 100 is operational, previous steps may be repeated (605). For example, if the target was improperly determined or estimated, the target may re-determined and/or re-estimated. As another example, if the waveguide 200 was misaligned, the waveguide 200 may be re-aligned. Correcting the source of an error may produce desirable results for operation of the system 100.

If energy was transmitted, the success of affecting (635) the target may be evaluated. Success may be measured with regard to a continuum. For example, if the target is a crowd, the crowd may be dispersed not at all, completely, or partially dispersed. Success may be measured with regard to binary outcomes. As an example, if the target is an electrical system, the system may be either disabled or not disabled.

If the target was not affected, alignment of the waveguide 200 may be analyzed (637). If the waveguide 200 is fixed within the housing 115 and the housing 115 is fixed with regard to the generator 105, the entire system 100 may be realigned in accordance with the target. If any of the waveguide 200 and housing 115 include moving parts, the moving parts may be adjusted to the point where the output wave beam is aligned for incidence with a target. If alignment is not proper, previous steps may be repeated (605). If alignment is proper, the wave beam may be initiated (620)

Success of the system 100 may be evaluated by analyzing (640) its effect on a target. If the system 100 is employed to achieve a specific result within a target, whether the result was achieved may be defined as success. If the system 100 is employed to direct energy away from the system 100, success may be defined by whether energy was transmitted from the system 100. If unsuccessful, the system 100 may be investigated (632) to determine whether it is operational.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms “comprise”, “comprises”, “comprising”, “having”, “including”, “includes” or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

SYSTEMS AND METHODS FOR WAVEGUIDES

In various representative aspects, the present invention provides systems and methods for waveguides. A waveguide may comprise a housing and a plurality of reflective surfaces configured to couple to the housing. The housing may be configured to couple to an electromagnetic wave beam generator. The electromagnetic wave beam generator may be configured to provide a wave beam having a polarization substantially similar to its original polarization. At least one of the plurality of reflective surfaces may be configured to convert the mode of an incident wave beam. The plurality of reflective surfaces may be configured for alignment in a waveguide.

We claim:

1. An active denial system, comprising:

a gyrotron configured to emit an incident wave beam having an emitted polarization substantially similar to a generated polarization;

a housing configured to couple to the gyrotron, wherein the housing is configured to selectively rotate about a principal axis of the gyrotron, wherein the housing is further configured to couple to a selectively rotatable mount; and a plurality of reflective surfaces configured to couple to the housing, wherein the plurality of reflective surfaces is configured for alignment in a waveguide, wherein a first reflective surface from the plurality of reflective surfaces comprises a substantially paraboloidal reflective surface, wherein a second reflective surface from the plurality of reflective surfaces is aligned between the first reflective surface and a third reflective surface along the waveguide, wherein the second reflective surface includes a mode convening substantially corrugated reflective surface, wherein the third reflective surface from the plurality of reflective surfaces comprises a substantially paraboloidal reflective surface, wherein the ratio of the focal length of the first reflective surface to the focal length of the third reflective surface corresponds to sin (β), where β is an angle of incidence of the second reflective surface, wherein a fourth reflective surfaces from the plurality of reflective surfaces is configured to couple with the selectively rotatable mount to selectively direct an incident wave beam to an antenna, wherein the housing further comprises a radome disposed between the waveguide and the antenna, and wherein the antenna is configured to direct the incident wave beam to a target.

2. A waveguide system for an electromagnetic energy emissive device, said system comprising:

a housing configured to couple to an electromagnetic wave beam generator, wherein the generator is configured to emit an incident wave beam into the housing, and wherein the housing is configured to selectively rotate about a principal axis of the generator; and a plurality of reflective surfaces coupled to the housing, wherein at least one reflective surface from the plurality of reflective surfaces is configured to convert a mode of the incident wave beam, and wherein the plurality of reflective surfaces is configured for alignment in a waveguide.

3. The system according to claim 2, wherein the generator comprises a gyrotron.

4. The system according to claim 2, wherein at the least one reflective surface is configured for beam conditioning.

5. A waveguide system for an electromagnetic energy emissive device, said system comprising:

a housing configured to couple to an electromagnetic wave beam generator, wherein the generator is configured to emit an incident wave beam into the housing; and a plurality of reflective surfaces coupled to the housing, wherein at least one reflective surface from the plurality of reflective surfaces includes a substantially corrugated reflective surface configured to convert a mode of the incident wave beam from a substantially circumferential polarization to a substantially linear polarization, and wherein the plurality of reflective surfaces is configured for alignment in a waveguide.

6. A waveguide system for an electromagnetic energy emissive device, said system comprising:

a housing configured to couple to an electromagnetic wave beam generator, wherein the generator is configured to emit an incident wave beam into the housing; and a plurality of reflective surfaces coupled to the housing and configured for alignment in a waveguide, wherein a first reflective surface from the plurality of reflective surfaces comprises a substantially paraboloidal reflective surface, wherein a third reflective surface from the plurality of reflective surfaces comprises a substantially paraboloidal reflective surface, wherein a second reflective surface from the plurality of reflective surfaces is aligned between the first reflective surface and third surface along the waveguide, wherein the second reflective surface includes a substantially corrugated reflective surface to convert a mode of the incident wave beam, and wherein the ratio of a focal length of the first reflective surface to a focal length of the third reflective surface corresponds to sin (β), where β is an angle of incidence of the second reflective surface.

7. A waveguide system for an electromagnetic energy emissive device, said system comprising:

a housing configured to couple to an electromagnetic wave beam generator, wherein the generator is configured to emit an incident wave beam into the housing; and a plurality of reflective surfaces coupled to the housing, wherein a first reflective surface from the plurality of reflective surfaces is configured to convert a mode of the unmodified incident wave beam, wherein the plurality of reflective surfaces is configured for alignment in a waveguide, and wherein a second reflective surface from the plurality of reflective surfaces is configured to reflect the incident wave beam to an antenna, wherein the antenna is configured to direct the incident wave beam to a target.

8. The system according to claim 7, wherein the housing further comprises a radome disposed between the waveguide and the antenna.

9. The system according to claim 7, wherein the housing is further configured to couple to a selectively rotatable mount configured to couple the second reflective surface, wherein the selectively rotatable mount is configured to selectively direct the incident wave beam as reflected by the second reflective surface.

10. A method for directing a wave beam from an electromagnetic wave beam generator, comprising:

guiding the wave beam with a waveguide including a plurality of reflective surfaces coupled to a housing, wherein the housing is rotatably coupled to the wave beam generator, and wherein at least one reflective surface from the plurality of reflective surfaces is configured to convert a mode of the wave beam; and selectively rotating the housing about a principal axis of the wave beam generator to direct the wave beam.

11. The method according to claim 10, wherein the generator comprises a gyrotron.

12. The method according to claim 10, wherein the at least one reflective surface is configured for beam conditioning.

13. A method for directing a wave beam from an electromagnetic wave beam generator, comprising:

guiding the wave beam with a waveguide including a plurality of reflective surfaces coupled to a housing, wherein the housing is coupled to the wave beam generator, wherein a first reflective surface from the plurality of reflective surfaces comprises a substantially paraboloidal reflective surface, wherein a third reflective surface from the plurality of reflective surfaces comprises a substantially paraboloidal reflective surface, wherein a second reflective surface from the plurality of reflective surfaces is aligned between the first reflective surface and third reflective surface along the waveguide, wherein the second reflective surface includes a substantially corrugated reflective surface to convert the mode, and wherein the ratio of the focal length of the first reflective surface to the focal length of the third reflective surface corresponds to sin (β), where β is the angle of incidence of the second reflective surface.

14. A method for directing a wave beam from an electromagnetic wave beam generator, comprising:

guiding the wave beam with a waveguide including a plurality of reflective surfaces coupled to a housing, wherein the housing is coupled to the wave beam generator, and wherein at least one reflective surface from the plurality of reflective surfaces includes a substantially corrugated reflective surface, wherein the substantially corrugated reflective surface is configured to convert the mode of the incident wave beam from a substantially circumferential polarization to a substantially linear polarization.

15. A method for directing a wave beam from an electromagnetic wave beam generator, comprising:

guiding the wave beam with a waveguide including a plurality of reflective surfaces coupled to a housing, wherein the housing is coupled to the wave beam generator, wherein a first reflective surface from the plurality of reflective surfaces is configured to convert a mode of the wave beam, and wherein a second reflective surface from the plurality of reflective surfaces is configured to reflect the incident wave beam to an antenna, wherein the antenna is configured to direct the incident wave beam to a target.

16. The method according to claim 15, wherein the housing is further configured to couple to a selectively rotatable mount configured to couple the second reflective surface, wherein the selectively rotatable mount is configured to selectively direct the incident wave beam as reflected by the second reflective surface.

17. The method according to claim 15, wherein the housing further comprises a radome disposed between the waveguide and the antenna.

* * * * *